(12) United States Patent
Noda

(10) Patent No.: US 10,884,327 B2
(45) Date of Patent: Jan. 5, 2021

(54) LIGHT SOURCE APPARATUS AND PROJECTION TYPE DISPLAY APPARATUS

(71) Applicant: CANON KABUSHIKI KAISHA, Tokyo (JP)

(72) Inventor: Toshiyuki Noda, Saitama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/254,683

(22) Filed: Jan. 23, 2019

(65) Prior Publication Data

US 2019/0235365 A1 Aug. 1, 2019

(30) Foreign Application Priority Data

Jan. 26, 2018 (JP) ................................. 2018-011391

(51) Int. Cl.
*G03B 21/16* (2006.01)
*G03B 21/20* (2006.01)

(52) U.S. Cl.
CPC ......... *G03B 21/16* (2013.01); *G03B 21/2013* (2013.01); *G03B 21/2033* (2013.01)

(58) Field of Classification Search
CPC ......... G03B 21/16; F21V 29/60; F21V 29/61; F21V 25/10
See application file for complete search history.

(56) References Cited

U.S. PATENT DOCUMENTS

| | | | | |
|---|---|---|---|---|
| 4,196,544 A | * | 4/1980 | Davis | A01G 7/045 47/17 |
| 6,181,070 B1 | * | 1/2001 | Dunn | F21V 29/02 315/112 |
| 6,225,907 B1 | * | 5/2001 | Derryberry | G05D 23/1904 340/584 |
| 6,352,358 B1 | * | 3/2002 | Lieberman | F21V 15/00 362/294 |
| 7,075,596 B2 | * | 7/2006 | Hosoda | H04N 5/7441 345/102 |
| 7,976,171 B2 | * | 7/2011 | Kameoka | G03B 21/2086 353/57 |
| 2005/0279949 A1 | * | 12/2005 | Oldham | F21K 9/00 250/458.1 |

(Continued)

FOREIGN PATENT DOCUMENTS

JP 2014186068 A 10/2014
JP 2017152355 A 8/2017

*Primary Examiner* — Erin Kryukova
*Assistant Examiner* — Christopher E Dunay
(74) *Attorney, Agent, or Firm* — Rossi, Kimms & McDowell LLP

(57) ABSTRACT

A light source apparatus includes a plurality of light sources, a heat receiver configured to receive heat from the plurality of light sources, a cooler configured to cool the heat receiver, a first detector configured to detect a temperature near a first light source among the plurality of light sources, a second detector configured to detect a temperature near a second light source among the plurality of light sources; and a controller configured to control the cooler based on detection results of the first detector and the second detector. When the detection result of the first detector cannot be used, the controller controls the cooler based on a value of the detection result of the second detector without using the detection result of the first detector.

17 Claims, 3 Drawing Sheets

(56) References Cited

U.S. PATENT DOCUMENTS

| | | | |
|---|---|---|---|
| 2006/0095157 A1* | 5/2006 | Raterman | B05C 11/1042 |
| | | | 700/231 |
| 2006/0121602 A1* | 6/2006 | Hoshizaki | G01N 21/645 |
| | | | 435/288.7 |
| 2009/0046465 A1* | 2/2009 | Hashimoto | F21K 9/00 |
| | | | 362/294 |
| 2009/0160344 A1* | 6/2009 | Hsu | F21K 9/00 |
| | | | 315/117 |
| 2009/0184619 A1* | 7/2009 | Lai | F21V 29/02 |
| | | | 313/13 |
| 2011/0042056 A1* | 2/2011 | Bae | F21V 29/004 |
| | | | 165/247 |
| 2012/0081007 A1* | 4/2012 | Sun | H05B 33/0854 |
| | | | 315/117 |
| 2015/0003491 A1* | 1/2015 | Matsumoto | G01K 1/20 |
| | | | 374/1 |

* cited by examiner

LIGHT SOURCE APPARATUS AND PROJECTION TYPE DISPLAY APPARATUS

BACKGROUND OF THE INVENTION

Field of the Invention

The present invention relates to a light source apparatus and a projection type display apparatus, each of which controls the temperature of a light source using a semiconductor light emitting element, such as a laser diode.

Description of the Related Art

A light source using a plurality of semiconductor light emitting elements (solid light sources) such as laser diodes, and having a high durability and a high luminance so as to adjust the brightness in multiple stages, have recently attracted attentions as a light source of a projection type display apparatus. Since the light emitting efficiency and forward current characteristic vary depending on the temperature in the semiconductor light emitting element, the brightness and the white balance of the projected image also vary accordingly. Japanese Patent Laid-Open No. ("JP") 2014-186068 discloses an image display apparatus that includes a sensor configured to measure the temperature of the light source and provides a control such that the temperature of the light source can be constant.

However, JP 2014-186068 is silent about an arrangement configuration of the plurality of semiconductor light emitting elements. In this case, when a temperature sensor is provided for each of the plurality of semiconductor light emitting elements, the structure becomes complicated and the manufacture cost increases. JP 2014-186068 is also silent about a control where there is an imbalance in the heating value among a plurality of semiconductor light emitting elements, such as when part of the plurality of semiconductor light emitting elements is used with a lowered output or failed.

When the semiconductor light emitting elements are arranged along a cooling direction, the cooling efficiency is different between an upper side and a lower side and the temperature imbalance occurs. The problem is not the temperature imbalance itself, but a light amount change caused by the temperature change from the initial state in use. The problem in this configuration is how to calculate a target temperature of the semiconductor light emitting element in which no temperature sensor is disposed.

SUMMARY OF THE INVENTION

The present invention provides a light source apparatus and a projection type display apparatus which can provide a control to maintain constant the temperature and to prevent the brightness from remarkably changing even when there is a heating value difference among a plurality of semiconductor light emitting elements.

A light source apparatus according to one aspect of the present invention includes a plurality of light sources, a heat receiver configured to receive heat from the plurality of light sources, a cooler configured to cool the heat receiver, a first detector configured to detect a temperature near a first light source among the plurality of light sources, a second detector configured to detect a temperature near a second light source among the plurality of light sources; and a controller configured to control the cooler based on detection results of the first detector and the second detector. When the detection result of the first detector cannot be used or when the first light source does not emit light and the second light source emits the light, the controller controls the cooler based on a value of the detection result of the second detector without using the detection result of the first detector. Alternatively, the controller provides different controls between when the detection result of the first detector cannot be used and the detection result of the second detector can be used and when the detection result of the second detector cannot be used and the detection result of the first detector can be used, or the controller provides different controls between when the first light source does not emit light and the second light source emits the light and when the second light source does not emit the light and the first light source emits the light. A projection type display apparatus according to another aspect of the present invention includes the above light source apparatus.

Further features of the present invention will become apparent from the following description of exemplary embodiments with reference to the attached drawings.

DESCRIPTION OF THE EMBODIMENTS

Figure 1:
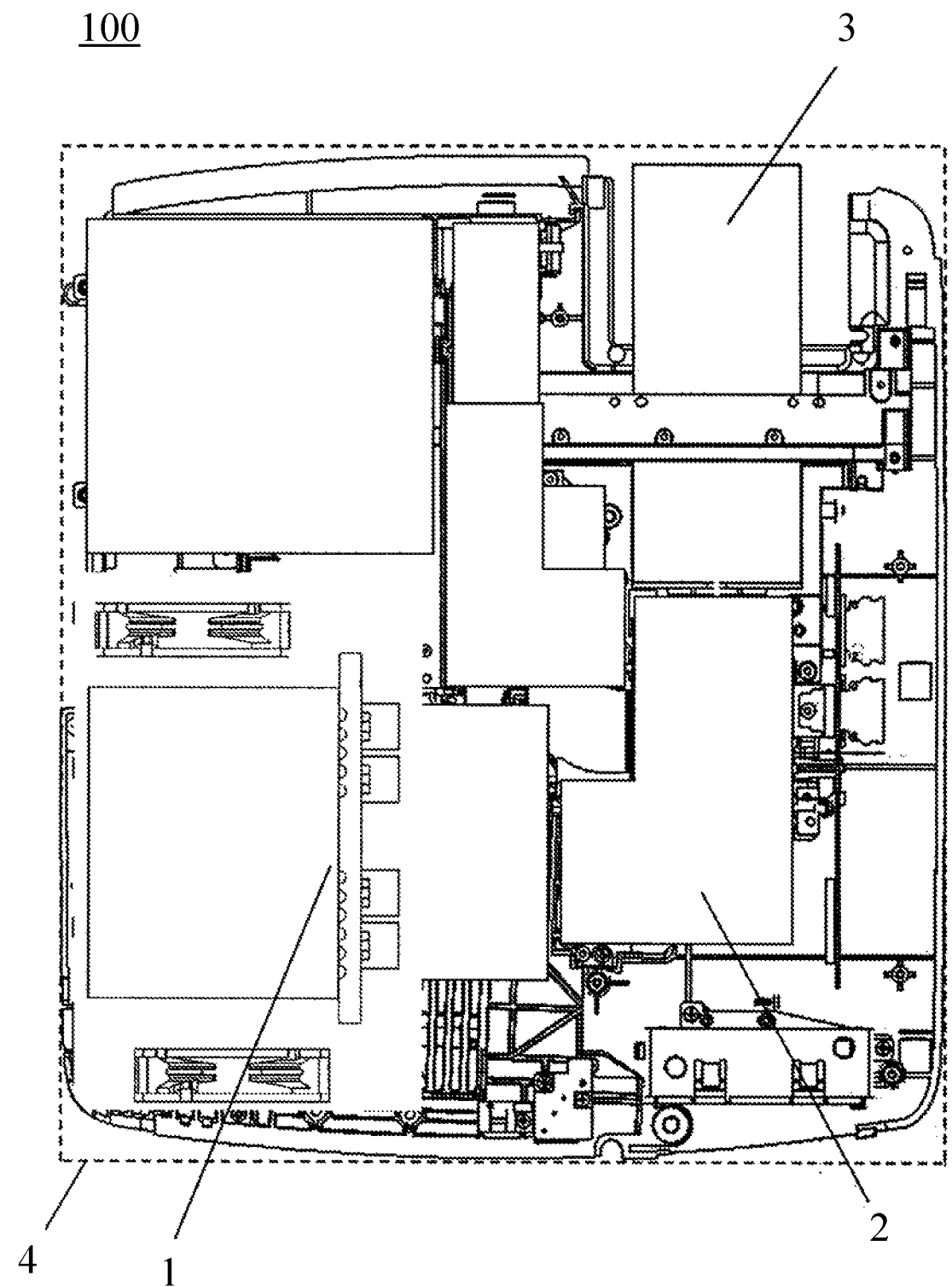
FIG. 1 illustrates an overall configuration of a projection type display apparatus according to one embodiment of the present invention.

Referring now to the accompanying drawings, a detailed description will be given of embodiments according to the present invention. In each figure, the same components will be designated by the same reference numerals, and a duplicate description thereof will be omitted.

FIG. 1 illustrates an overall configuration of a projection type display apparatus 100 according to one embodiment of the present invention. The projection type display apparatus 100 includes a light source apparatus 1, an illumination, color separating, and color combining optical system 2 configured to add image information to light from the light source apparatus 1, a projection lens 3 configured to project the light onto an external screen, an unillustrated circuit substrate configured to control the light source apparatus 1, and an exterior case 4 housing these components.

Figure 2:
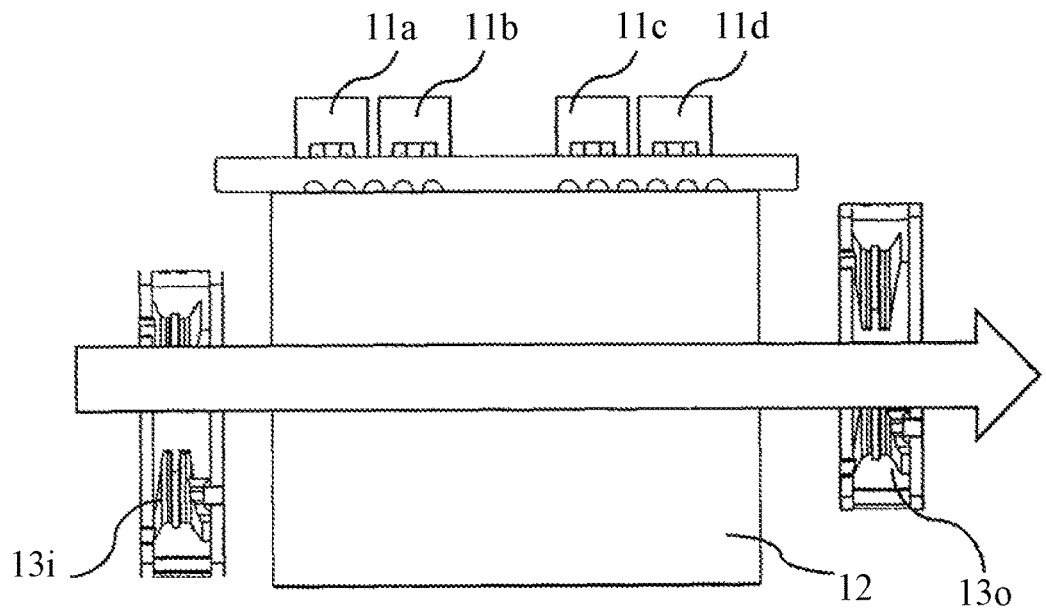
FIG. 2 schematically illustrates a configuration of a light source apparatus.

FIG. 2 schematically illustrates a configuration of the light source apparatus 1. Each of light sources 11a to 11d includes a plurality of semiconductor light emitting elements (solid light sources). A radiator (heat receiver) 12 receives the heat from each of the light sources 11a to 11d and transmits the heat from the light sources 11a to 11d. Fans 13i and 13o blow cooling air in an arrow direction in the figure to cool the radiator 12. While this embodiment provides four light sources, but the present invention is not limited to this number.

Since the light sources 11a to 11d are thermally connected to one radiator 12, they are not cooled independently of each other and thermally affect each other. In the configuration illustrated in FIG. 2, the light source 11a disposed on the windward side is more likely to be cooled by the fans 13i and 13o, and the light source 11d disposed on the lee side is less likely to be cooled. Therefore, the temperature of the light source 11d is likely to be higher than that of the light source 11a. In other words, the cooling efficiencies of the light sources 11a and 11d by the fans are different from each other. In the configuration of FIG. 2, a temperature difference between the light sources 11a and 11d is ΔT in the initial state.

A problem is that a light amount or a tint changes depending on the time and environment of the light source apparatus that is being used, rather than the temperature difference among the light sources 11a to 11d. It is thus necessary to maintain the temperature in the initial state in response to the usage situation of the user. Accordingly, this embodiment attaches temperature sensors to the light sources 11a and 11d, and controls the fans 13i and 13o so that detected values of the temperature sensors become constant.

Figure 3:
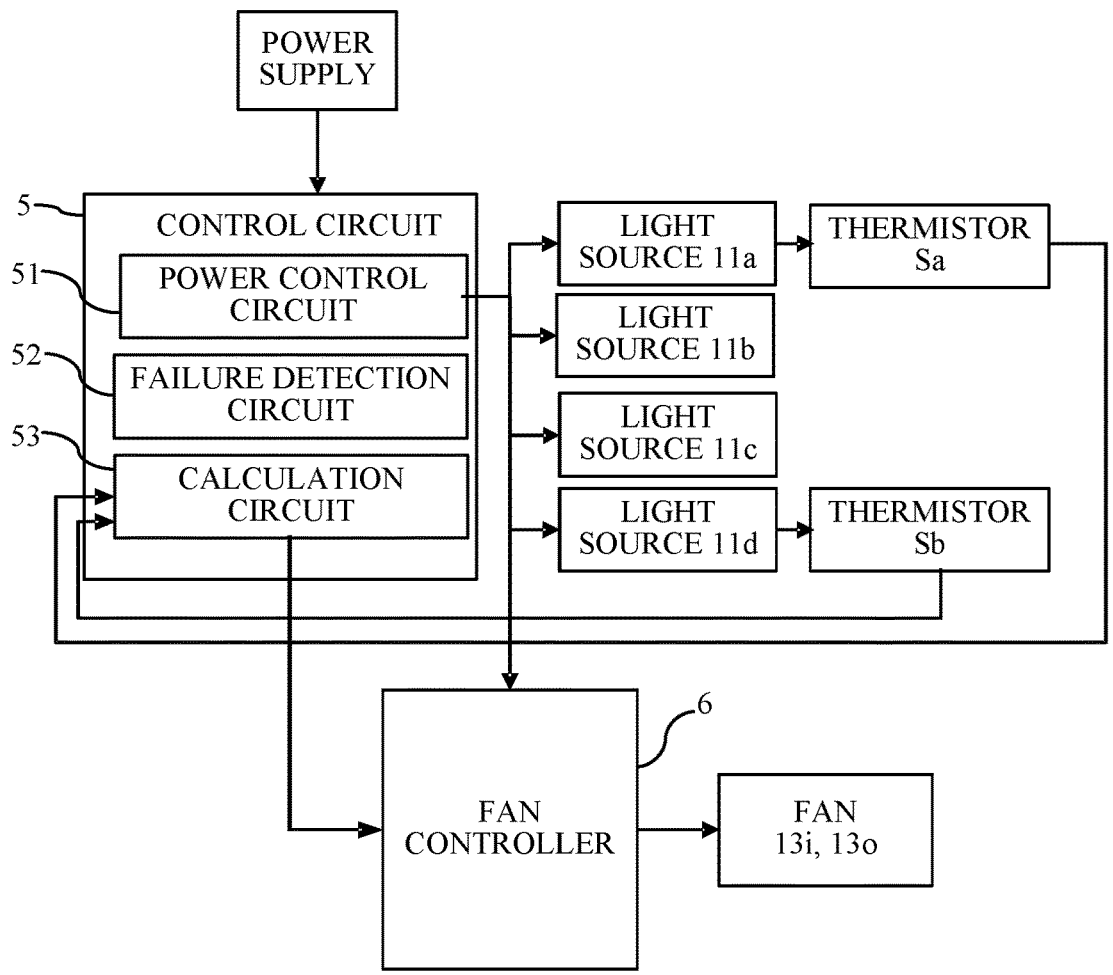
FIG. 3 is a block diagram of a control system.

FIG. 3 is a block diagram of a control system. A control circuit 5 includes a power control circuit (power supply) 51, a failure detection circuit (failure detector) 52, and a calculation circuit (controller) 53. When the power is turned on by the user, the power control circuit 51 supplies the electric power to the light sources 11a to 11d and the electric power to a fan controller 6 so as to drive the fans 13i and 13o. As disclosed in JP 2017-152355, the failure detection circuit 52 includes a short circuit for short-circuiting the light source, detects the state of each of the light sources 11a to 11d having a plurality of semiconductor light emitting elements, and can specify the failed one of the light sources 11a to 11d.

A thermistor (first (temperature) detector) Sa is provided near the light source 11a and detects the temperature near the light source 11a. A thermistor (second (temperature) detector) Sd is provided near the light source 11d and detects the temperature near the light source 11d. The calculation circuit 53 controls the temperatures of the light sources 11a to 11d by controlling the fans 13i and 13o via the fan controller 6 based on the detection results of the thermistors Sa and Sb. The fan controller 6 drives the fans 13i and 13o based on the control signal output from the calculation circuit 53. This embodiment provides the thermistors Sa and Sd to the light sources 11a and 11d, which are located at both ends of the plurality of light sources arranged in series, but the present invention is not limited to this embodiment. For example, the thermistors may be provided to the symmetrically arranged light sources, such as the light sources 11b and 11c.

Figure 4:
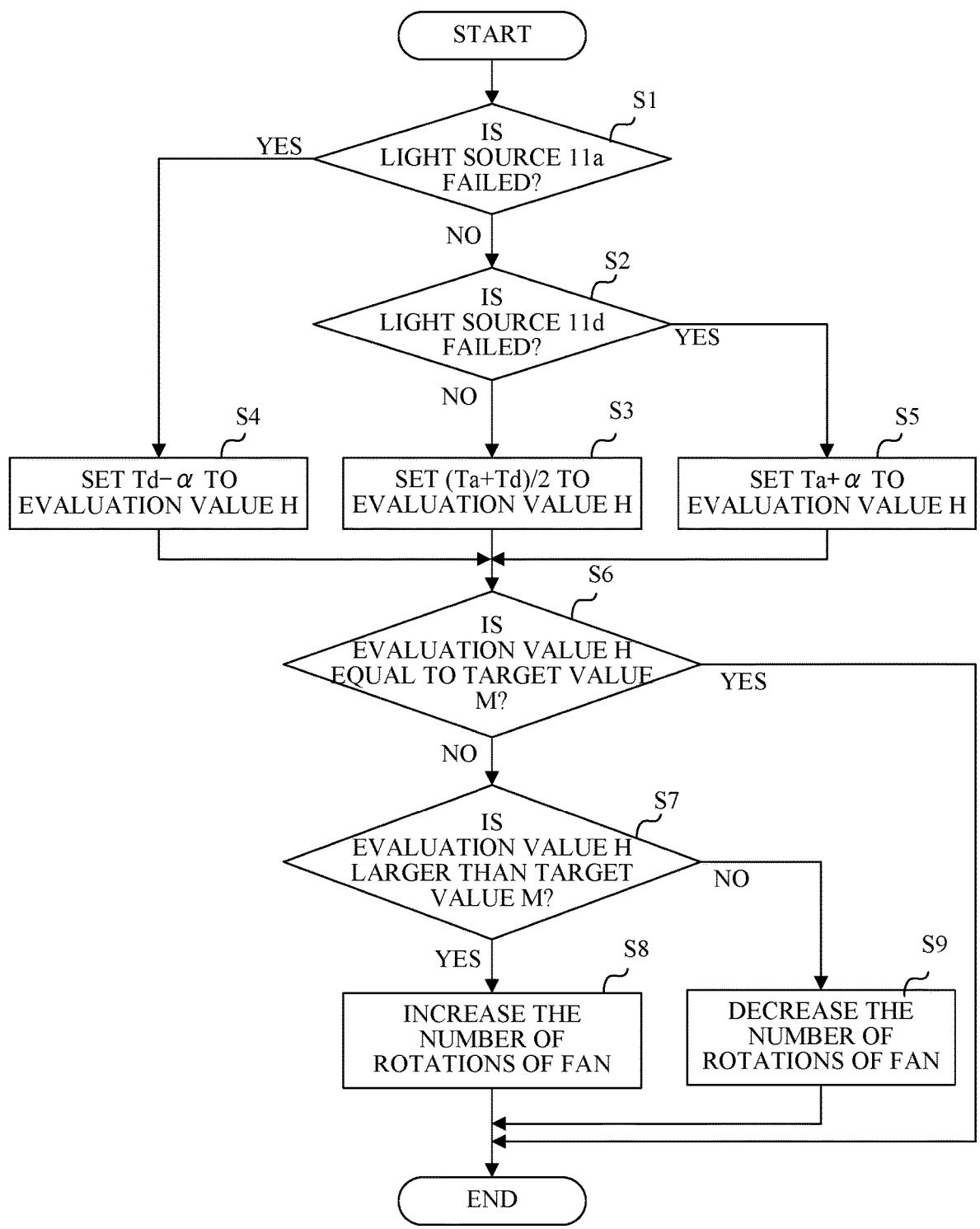
FIG. 4 is a flowchart illustrating a light source control method.

Referring now to FIG. 4, a description will be given of a light source control method according to this embodiment. FIG. 4 is a flowchart illustrating the light source control method.

In the step S1, the failure detection circuit 52 determines whether or not the light source 11a has failed or broken down. If the light source 11a has not failed, the flow proceeds to the step S2, and if it has failed, the flow proceeds to the step S4.

In the step S2, the failure detection circuit 52 determines whether or not the light source 11d has failed. If the light source 11d has not failed, the flow proceeds to the step S3, and if it has failed, the flow proceeds to the step S5.

In the step S3, the calculation circuit 53 sets an average value (Ta+Td)/2 of a detection value Ta of the thermistor Sa and a detection value Td of the thermistor Sd to an evaluation value (current temperature) H. The processing of this step is executed when none of the light sources 11a and 11d have failed or when the detection value Ta of the thermistor Sa and the detection value Td of the thermistor Sd can be used. Cases where none of the light sources 11a and 11d have failed includes not only a case where all of the light sources 11a to 11d are normally driven but also a case where at least one of the light sources 11b and 11c has failed. Even when at least one of the light sources 11b and 11c has failed, both the light sources 11a and 11b are normally driven and thus the evaluation value H can be set to an average value of the detection value Ta of the thermistor Sa and the detection value Td of the thermistor Sd.

In the step S4, the light source 11a is not normally driven and the detection value Ta of the thermistor Sa is unusable. Therefore, the calculation circuit 53 sets to the evaluation value H, a value (Td−α) made by offsetting the detection value Td of the thermistor Sd by a predetermined value α (α>0) to the lower side without using the detection value Ta of the thermistor Sa. This embodiment uses, as the illustrative predetermined value α, a half value (ΔT/2) of the temperature difference ΔT between the light sources 11a and 11d in the initial state.

In the step S5, the light source 11d is not normally driven and the detection value Td of the thermistor Sd cannot be used. Therefore, the calculation circuit 53 sets to the evaluation value H, a value (Ta+α) made by offsetting the detection value Ta of the thermistor Sa by a predetermined value α (α>0) to the higher side without using the detection value Td of the thermistor Sb. This embodiment uses, as the illustrative predetermined value α, a half value (ΔT/2) of the temperature difference ΔT between the light source 11a and 11d in the initial state.

In the step S6, the calculation circuit 53 determines whether or not the evaluation value (current temperature) H is equal to an initially set target value (target temperature) M. If the evaluation value H is equal to the target value M, the flow ends. If not, the flow proceeds to the step S7.

In the step S7, the calculation circuit 53 determines whether or not the evaluation value H is larger than the target value M. When the evaluation value H is larger than the target value M, the flow proceeds to the step S8, and if it is smaller, the flow proceeds to the step S9.

In the step S8, the calculation circuit 53 outputs a control signal to the fan controller 6 in order to increase the cooling capacities of the fans 13i and 13o and instructs the fan controller 6 to increase the number of rotations of the fans 13i and 13o in order to make the evaluation value H closer to the target value M.

In the step S9, in order to relax the cooling capacities of the fans 13i and 13o and to make the evaluation value H closer to the target value M, the calculation circuit 53 outputs a control signal to the fan controller 6 and instructs it to decrease the number of rotations of the fans 13i and 13o.

In other words, w the cooling efficiencies of the fans 13i and 13o when the evaluation value H is higher than the target value M, are set higher than those when the evaluation value H is lower than the target value M so as to cool the light sources more efficiently.

As described above, this embodiment can properly evaluate the current temperature representing all the light sources through the two thermistors, without disposing thermistors for all the light sources 11a to 11d, even when there is a heating value imbalance among the plurality of light sources 11a to 11d. This configuration can provide a projection type display apparatus with few light amount changes and few color changes, since the temperature of the light source can be kept almost constant.

While this embodiment has described a case where one of the light sources 11a to 11d has failed, the present invention is not limited to this embodiment. For example, the present invention is also applicable to a case where the power control circuit 51 intentionally limits the power supply to lower the output of part of light sources, or a case where part of light sources is not intentionally used.

This embodiment cools the radiator 12 through the fans 13i and 13o, but the present invention is not limited to this embodiment. The present invention is also applicable to a liquid-cooled circulation system having a temperature gradient configuration between the upstream side and the downstream side in a liquid-cooling coolant introduction direction. In this case, instead of the radiator 12, the heat receiver may use a member having a structure which receives the heat from the light sources 11a to 11d and transmits the heat to the liquid.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-011391, filed on Jan. 26, 2018, which is hereby incorporated by reference herein in its entirety.

What is claimed is:

1. A light source apparatus comprising:
a plurality of light sources;
a heat receiver configured to receive heat from the plurality of light sources;
a cooler configured to cool the heat receiver;
a first detector configured to detect a temperature near a first light source, among the plurality of light sources;
a second detector configured to detect a temperature near a second light source, among the plurality of light sources; and
a controller configured to control the cooler based on detection results of the first detector, and the second detector,
wherein, upon the first light source failing, the controller controls the cooler based on the detection result of the second detector without using the detection result of the first detector.

2. The light source apparatus according to claim 1, wherein, upon the first light source failing, the controller controls the cooler based on a value obtained by offsetting a value of the detection result of the second detector by a predetermined value.

3. The light source apparatus according to claim 1, wherein:
the first light source is disposed at a position where the first light source is more likely to be cooled by the cooler than the second light source, and
upon the first light source failing, the controller controls the cooler based on a value obtained by lowering a value of the detection result of the second detector by a predetermined value.

4. The light source apparatus according to claim 1, wherein:
the first light source is disposed at a position where the first light source is less likely to be cooled by the cooler than the second light source, and
upon the controller controls the cooler based on a value obtained by increasing a value of the detection result of the second detector by a predetermined value.

5. The light source apparatus according to claim 1, wherein cooling efficiencies of the first light source and the second light source by the cooler are different.

6. The light source apparatus according to claim 1, wherein upon the first and second light sources functioning, the controller controls the cooler based on an average value of values of the detection results of the first detector and the second detector.

7. The light source apparatus according to claim 6, wherein the controller:
controls the cooler based further a target value; and
increases the cooling efficiency of the cooler, upon a value of each of the detection results by the first detector and the second detector being higher than the target value, to higher than that where the value of each of the detection results by the first detector and the second detector is lower than the target value.

8. The light source apparatus according to claim 1, further comprising:
a power supply configured to supply a power to the plurality of light sources,
wherein the controller, upon the first light source failing, controls the power supply to limit a supply of the power to the failing first light source.

9. The light source apparatus according to claim 1, further comprising:
a failure detector configured to specify a failed light source among the plurality of light sources,
wherein the controller, upon the failure detector specifying that the first light source failed, controls power supply to the first light source.

10. The light source apparatus according to claim 1, wherein:
the heat receiver is a radiator configured to radiate the heat from the plurality of light sources, and
the cooler includes a fan.

11. The light source apparatus according to claim 1, wherein upon the first light source not emitting light, indicating the first light source failing, and the second light source emitting light, the controller controls the cooler based on a value obtained by offsetting a value of the detection result of the second detector by a predetermined value.

12. The light source apparatus according to claim 1, wherein:
the first light source is disposed at a position where the first light source is more likely to be cooled by the cooler than the second light source, and
upon the first light source not emitting light, indicating the first light source failing, and the second light source emitting light, the controller controls the cooler based on a value obtained by lowering a value of the detection result of the second detector by a predetermined value.

13. The light source apparatus according to claim 1, wherein:
the first light source is disposed at a position where the first light source is less likely to be cooled by the cooler than the second light source, and
upon the first light source not emitting light, indicating the first light source failing, and the second light source emitting light, the controller controls the cooler based on a value obtained by increasing a value of the detection result of the second detector by a predetermined value.

14. The light source apparatus according to claim 1, wherein the number of light sources is larger than the number of detectors including the first and second detectors.

15. A projection type display apparatus comprising:
a projection lens;
a plurality of light sources;
a heat receiver configured to receive heat from the plurality of light sources;
a cooler configured to cool the heat receiver;
a first detector configured to detect a temperature near a first light source among the plurality of light sources;

a second detector configured to detect a temperature near a second light source among the plurality of light sources; and a controller configured to control the cooler based on detection results of the first detector and the second detector, wherein, upon the first light source failing, the controller controls the cooler based on the detection result of the second detector without using the detection result of the first detector.

16. A light source apparatus comprising:

a plurality of light sources;

a heat receiver configured to receive heat from the plurality of light sources;

a cooler configured to cool the heat receiver;

a first detector configured to detect a temperature near a first light source among the plurality of light sources;

a second detector configured to detect a temperature near a second light source among the plurality of light sources; and a controller configured to control the cooler based on detection results of the first detector and the second detector, wherein the controller provides different controls between when the first light source fails while the second light source functions and when the second light source fails while the first light source functions.

17. A light source apparatus comprising:

a plurality of light sources;

a heat receiver configured to receive heat from the plurality of light sources;

a cooler configured to cool the heat receiver;

a first detector configured to detect a temperature near a first light source among the plurality of light sources;

a second detector configured to detect a temperature near a second light source among the plurality of light sources; and a controller configured to control the cooler based on detection results of the first detector and the second detector, wherein the controller provides different controls between when the first light source does not emit light while the second light source emits light and when the second light source does not emit light while the first light source emits light.

* * * * *